(No Model.) 2 Sheets—Sheet 1.
J. FOOS & C. F. ENDTER.
GAS ENGINE.
No. 494,134. Patented Mar. 28, 1893.
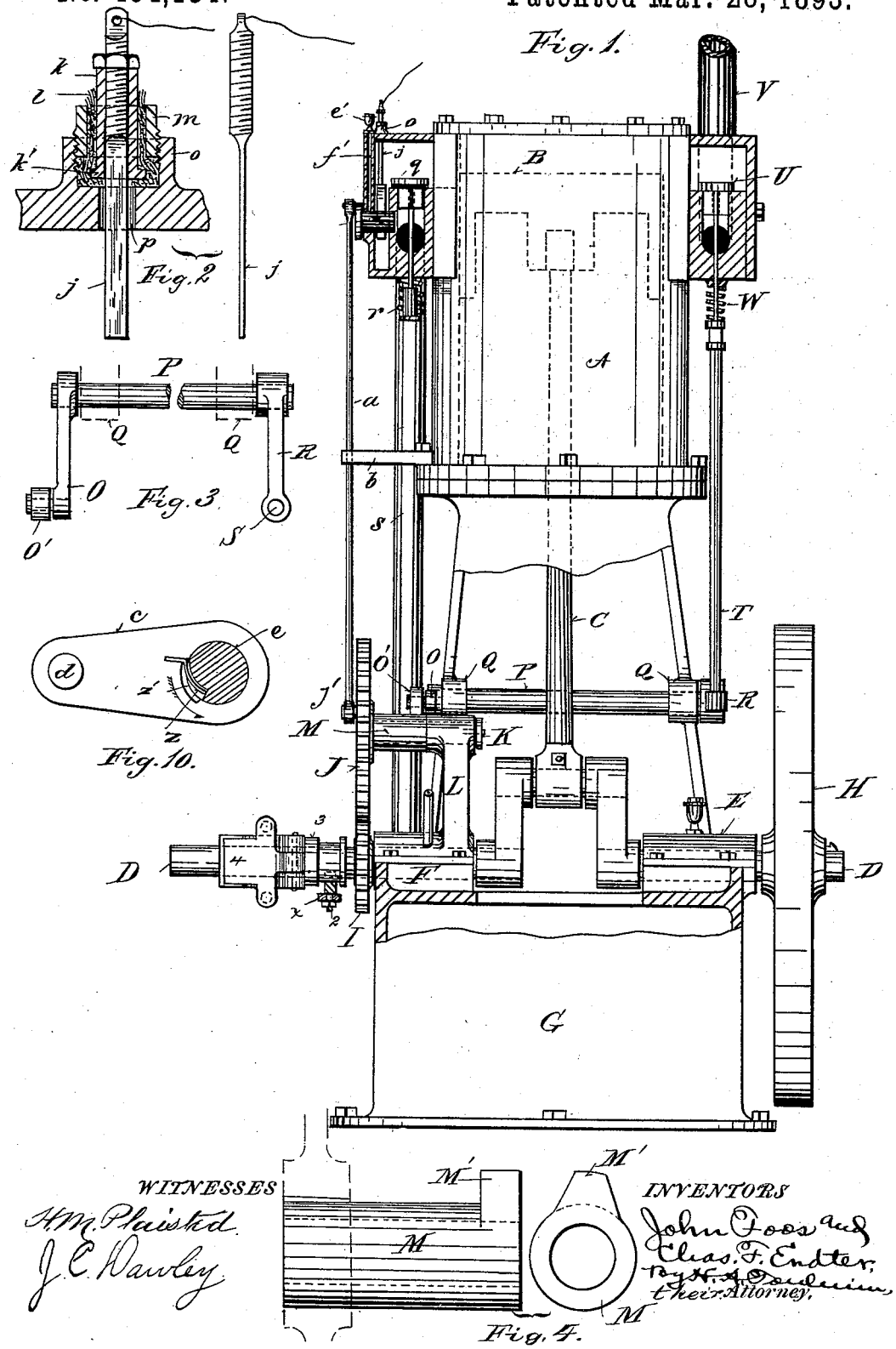
WITNESSES
H. M. Plaisted
J. C. Dawley
INVENTORS
John Foos and
Chas. F. Endter
By H. A. Toulmin
their Attorney

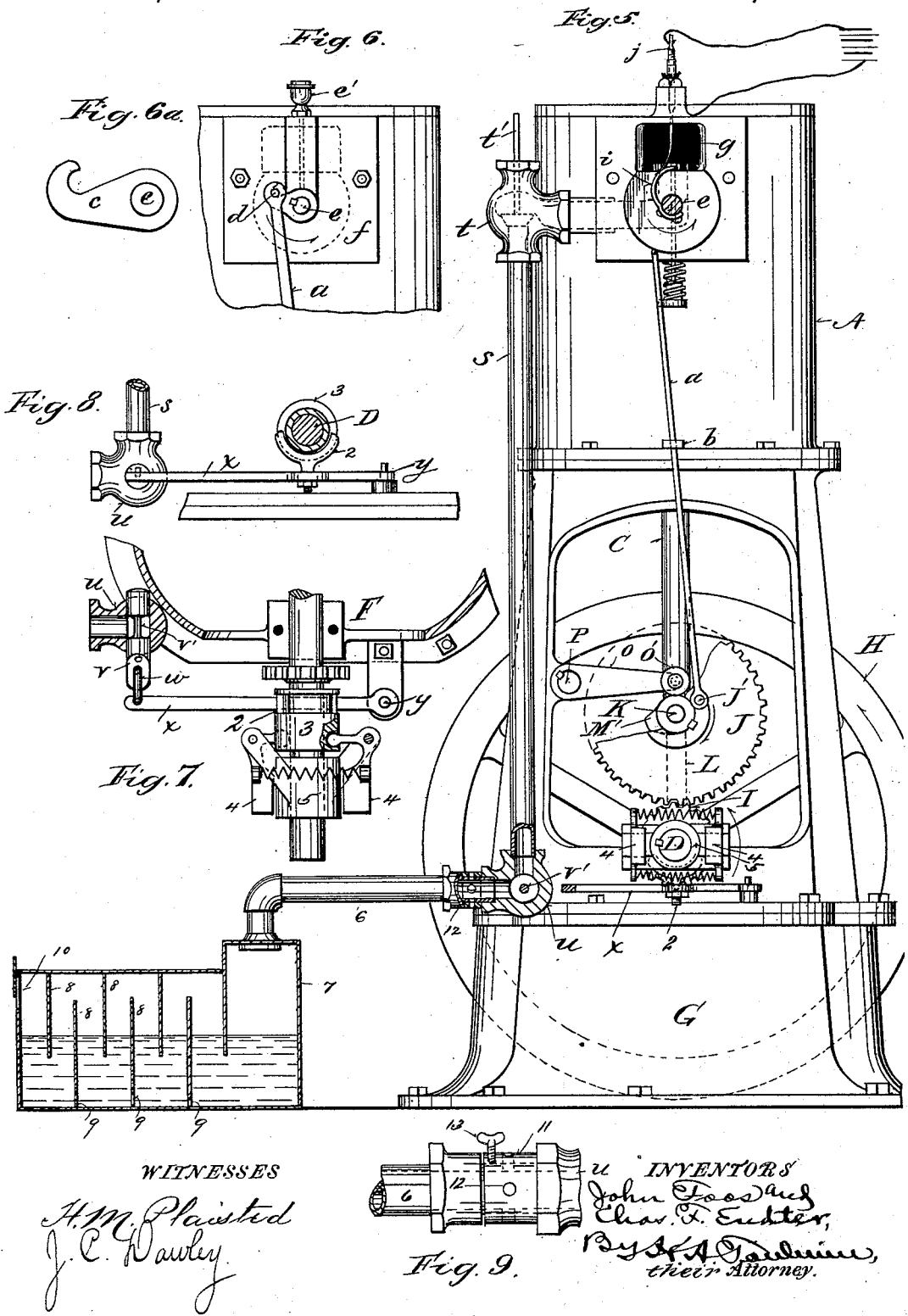

UNITED STATES PATENT OFFICE.

JOHN FOOS AND CHARLES F. ENDTER, OF SPRINGFIELD, OHIO; SAID ENDTER ASSIGNOR TO SAID FOOS.

GAS-ENGINE.

SPECIFICATION forming part of Letters Patent No. 494,134, dated March 28, 1893.

Application filed June 15, 1891. Serial No. 396,230. (No model.)

*To all whom it may concern:*

Be it known that we, JOHN FOOS and CHARLES F. ENDTER, citizens of the United States, residing at Springfield, in the county of Clark and State of Ohio, have invented certain new and useful Improvements in Gas-Engines, of which the following is a specification, reference being had therein to the accompanying drawings.

Our invention relates to certain new and useful improvements in gas engines, the peculiarities of which will be hereinafter fully described in the specification and particularly pointed out in the claims.

In the accompanying drawings on which like reference letters and numerals indicate corresponding parts, Figure 1 represents a partial sectional view of a gas engine with our improvements applied thereto; Fig. 2. a detail edge view of one electrode and face view of the same in its mountings; Fig. 3. a plan view of a double crank lever for operating the exhaust; Fig. 4. an enlarged side and end view of the sleeve cam; Fig. 5. a side view of the engine similar to Fig. 1, the cap of the igniting chamber being removed; Fig. 6. a detached view of the hook crank for the rotary electrode. Fig. 6ª represents a detail view of the hook crank; Fig. 7. a plan and a partial sectional view of a portion of the engine, the main shaft and adjacent parts, the mixer being shown in section; Fig. 8. a side elevation of the mixer valve and its operating lever; Fig. 9, an enlarged view of the collar regulating the inlet of pure air; and Fig. 10, a safety ratchet for an electrode shaft.

The letter A, designates the cylinder of the gas engine provided with a piston B, connected by a rod C, to the crank shaft D, mounted in bearings E, and F, supported by the base G, having a supporting flange and bolted or otherwise secured, to a firm foundation. A fly wheel H, is mounted on one end of said main shaft, adjacent to the bearing E, and a gear I, is mounted opposite the bearing F, and meshes with a wheel J, mounted on a stud K, keyed or otherwise secured to a post L, carried by the cap of said bearing F. The gear wheel J, is provided with a sleeve M, keyed or otherwise secured thereto, and forming an extension of the hub of said wheel, and adapted to rotate on said fixed stud K. This sleeve is provided with a cam M', Fig. 4 adapted to engage with one arm O, of the double armed rock shaft P, supported in bearings Q, the other arm R, of which shaft is provided with a socket S, or otherwise adapted to be engaged with an exhaust rod T, whereby the exhaust valve U, Fig. 1, is raised from its seat to allow the escape of the spent charge through the exhaust pipe V. The spring W, preserves the normally closed position of said valve U, except when raised by the oscillating of the double crank lever P, effected by the said cam M'. A roller O', mounted on the end of said arm O, reduces the frictional contact between the said cam and arm, and the ratio between the gears I, and J, corresponds to the stroke of the piston in order to effect the opening of the exhaust at suitable intervals. The post L, and its stud K, form a firm support for the wheel J and its sleeve cam, without other connecting braces or supports, and allow free play of the arm O.

The wheel J, is provided with a crank pin J', to which is connected a rod, *a*, adapted to reciprocate through a guide *b*, as its lower end rotates with said wheel J, while its upper end engages with a hook crank, *c*, by a pin or small projection *d*. A shaft *e*, carries said hook crank *c*, and passes through a box in the cap *f*, of the igniting chamber *g*, said box being conveniently oiled through a passage *f'*, connecting with the oil cup, *e'*, or otherwise. The shaft *e*, also carries an electrode, preferably in the form of a yielding piece *i*, screwed, or otherwise fastened to said shaft, and adapted to rotate continuously together with its crank *c*. At each rotation it comes in contact with its opposite electrode *j*, preferably consisting of an adjustable elastic, flexible piece, its lower end being flattened to form a spring, and its upper portion mounted in a screw threaded sleeve *k*, preferably having a flange *k'*, at the bottom, and wrapped with insulating material, *l*, such as asbestus, and provided with a nut or collar *m*, threaded into a boss, *o*, of said igniting chamber, and thus supporting said flexible electrode in an insulated condition within an opening *p*, through which it extends into the igniting chamber *g*.

As seen from Fig. 5, where the cap of the igniting chamber has been removed, the flexible electrode $j$, is engaged by the rotary electrode $i$, at each rotation by a wiping contact, which bends the said flexible electrode till it suddenly snaps off from the rotary electrode with an instantaneous spring action and produces the igniting spark. This wiping action between the two electrodes, secures perfect contact by the slightly abrasive action of one upon the other and the spring like disengagement of the two electrodes causes a spark of high temperature. As seen from Fig. 5 the rotary electrode at its contact end is inclined obliquely to the stationary electrode, whereby the contact between the said electrodes will be begun gently and increase as the rotary electrode passes the stationary electrode with a sliding abrasive action thereon due to the flexibility of the opposite electrode. This gentle approach to, and long contact with, the stationary electrode, together with the snap-like disengagement of the parts after such intimate contact, secures a perfection of action and a resulting spark of high temperature.

The electric wires are secured, one to the electrode $j$, and the other to any part of the machine as indicated in Fig. 5. Either electrode may be flexible as shown in this figure; or one only may be flexible and the other rigid. For instance the electrode $i$ may be rigid and the stationary electrode flexible; or vice versa. The abrasive action of said electrodes, secures a clean surface for the contact thereof, and admits of closing the circuit instantly, as the engaging surfaces are kept clean by the said friction of the wiping abrasive action, above described. The downward action of the piston produces a suction which elevates the inlet valve $q$ against the closing action of the spring $r$. The inlet pipe $s$ is also provided with a check valve $t$, and with a regulating valve $u$, preferably consisting of a sliding piece $v$, and having a diminished central portion $v'$, and an enlarged end portion, whereby the mixed charge of pure air and carbureted air is regulated in its passage through the pipe $s$ to the igniting chamber. The sliding piece $v$, is adjustably connected by a link $w$, or otherwise, to the lever $x$, pivoted at $y$, and having a sliding engagement, through a pivoted yoke 2, with a sliding piece 3, mounted on said main shaft D, and engaged by a centrifugal governor to be operated back and forth on said shaft, and thus actuate the said sliding piece of the regulating valve. The link $w$ may be adjusted in a series of holes in said piece $v$, and thus vary the influence of the lever $x$ thereon.

A form of centrifugal governor is shown in Figs. 5 and 7, and consists of pivoted weights 4, normally held by springs 5, in a closed position, but adapted, by the rotation of the shaft, to swing outward and operate the sliding piece 3 more or less along the shaft, according to the speed of the engine. A pipe 6 connects said regulating valve with the carbureting device, consisting of a vessel 7, having partitions 8 alternately arranged therein, as shown in Fig. 5; the upper series of partitions extending downward, toward the bottom of said vessel and below the level of the carbureting liquid contained therein. Apertures 9, in the lower series of partitions, allow the liquid to maintain a uniform level in said vessel, and thus preserve a uniformity of action in drawing the air under the successive partitions of the upper, and over those of the lower series, to effect the carbureting of said air. The suction of the descending piston will lift the inlet and check valves, $q$, and $t$, respectively and draw in pure air through an opening 10, in said vessel, which air must pass through the carbureting liquid between said partitions 8, thus charging the air before it enters the regulating valve $u$. This carbureted air is mixed with a suitable quantity of pure air, which is drawn in through perforations in the collar 11, matching similar openings in the mixer 12. This collar 11, is adapted to be rotated and thus vary the size of the openings for the admission of pure air. The set screw $b$, sets the collar in any desired position.

It will be observed that pure air is mixed with carbureted air, before the regulating valve is reached, and that the amount of the resulting mixture is then regulated in its admission to the igniting chamber, by a governor controlled mechanism, without further treatment thereof. The regulated quantity of the charging mixture simply passes along the pipe connections from the regulating valve to the igniting chamber under the suction of the descending piston. At the proper instant, the igniting spark is produced by the action of the rotary and flexible electrodes, above described, thus exploding the charge and operating the engine. The valve, $t$, may be dispensed with if desired, and the pipe, $s$, deliver directly to the inlet valve $q$. The method of making said charging mixture, and of using the same, is as follows: The air is first carbureted and caused to flow toward the regulating valve, and before it reaches said valve a suitable quantity of pure air is mixed therewith to form an explosive compound, which mixture, thus prepared, is then passed to the igniting chamber in suitable regulated quantities to form the charges.

Any suitable carbureting liquid, such as gasoline, or any volatile hydrocarbon, may be used in the carbureting device as previously described.

Referring to the rod $a$, and its connection to the hook crank $c$, it will be seen that the rod will operate the crank in one direction only. In case the engine be reversed slightly the pin $d$, will simply disengage from the crank without reversing the rotary electrode, and thus avoid fracture of the electrodes, which might occur if said reverse action took place when they were in the engaged position shown in Fig 5. This form of safety connection, also allows of rotating the shaft, $e$, by hand, to start the engine quickly, and then engage the crank with its rod $a$. One, or both, of the electrodes may be yielding and elastic, to effect the wiping contact and the spring-like snap in breaking said contact. Either of the two may be a yielding elastic electrode, and the other a rigid one. The wiping contact and snap-like disengagement would be secured in either form. The advantage in making both elastic is, that in case they were in contact as in Fig. 5, and the shaft $e$, were reversed, they would both yield together with less liability to fracture than if only one were yielding.

In Fig. 10, we show the preferred form of mounting the crank $c$, upon the electrode shaft $e$, or elsewhere, to prevent rotating the electrode reversely. In this form the crank is loosely mounted upon the shaft, but has an operative engagement therewith by means of a spring pawl $z$, carried by the crank and adapted to engage with a shoulder on the shaft when rotated in one direction, and to be pressed outward into a socket $z'$ in said crank without rotating the shaft, when the crank is reversely operated. Either member may carry the spring pawl adapted to engage with the shoulder or projection on the other member. In this form the pin $d$, preferably serves as a wrist pin for the rod $a$.

Having thus fully described our invention, what we claim as new, and desire to secure by Letters Patent, is—

1. In a gas engine, the combination with a cylinder having an igniting chamber, and an adjustable flexible electrode mounted in said chamber, and adapted to be adjusted inward and outward according to the wear, of a rotatable electrode operating with said stationary electrode and acting safely in one direction only, a hook-crank for the rotatable electrode, the shaft of the latter extending outside of the chamber of said crank, a reciprocating rod, one end having a pin normally engaged with said hook-crank when said end is rotated in one direction, and disengaging automatically when reversely rotated, an eye post forming a guide for the middle portion of said rod to guide it in its reciprocation, and means to rotate the other end of said rod and effect its reciprocation and the rotation of said electrodes.

2. In a gas engine, the combination with an igniting chamber having a screwthreaded opening and of contracted size at one end, of the electrode mounted in said opening, a sleeve thereon having a flange at its inner end, insulating material about said sleeve and flange and a collar about said insulating material, and screw threaded into said opening at its larger end, whereby the said collar will press upon the flanged sleeve and interposed insulating material and maintain the said electrode in position.

3. The combination with a gas engine, cylinder having an igniting chamber, electrodes mounted therein and an operative connection therefor, of a centrifugal governor mounted on said shaft, a carburetor, and a pipe connecting its igniting chamber, a mixing and regulating valve mounted in said pipe, the valve consisting of a perforated collar to admit air and a sliding piece forming the valve proper and having a reduced central portion to admit of the passage of the charge, a lever arm to reciprocate said valve proper and actuated by said governor, and an adjustable connection between the said valve proper and the said lever arm.

In testimony whereof we affix our signatures in presence of two witnesses.

JOHN FOOS.
CHAS. F. ENDTER.

Witnesses:
OLIVER H. MILLER,
JNO. F. CHORPENING.